United States Patent
Simoes et al.

(10) Patent No.: US 9,210,274 B2
(45) Date of Patent: Dec. 8, 2015

(54) SYSTEM AND METHOD OF TRANSFERRING INFORMATION BETWEEN CONTACT CENTERS

(75) Inventors: Renato Simoes, Fortaleza-CE (BR); Brian Hillis, Centennial, CO (US); Roderick Averill, Centennial, CO (US); Kevin J. Muterspaugh, Castle Rock, CO (US)

(73) Assignee: Avaya Inc., Basking Ridge, NJ (US)

( * ) Notice: Subject to any disclaimer, the term of this patent is extended or adjusted under 35 U.S.C. 154(b) by 196 days.

(21) Appl. No.: 13/196,296

(22) Filed: Aug. 2, 2011

(65) Prior Publication Data
US 2013/0034025 A1  Feb. 7, 2013

(51) Int. Cl.
*H04M 15/06* (2006.01)
*H04M 3/51* (2006.01)

(52) U.S. Cl.
CPC ..................... *H04M 15/06* (2013.01)

(58) Field of Classification Search
CPC ........ B21B 9/00; C21D 6/005; C21D 9/0068; C21D 9/46; C22C 38/001; C22C 38/002; C22C 38/02; C22C 38/06; C22C 38/42; C22C 38/46; C22C 38/50; C22C 38/58; H01M 4/1391; H01M 4/525; H01M 15/06; H04M 16/06; H04M 3/5183
USPC ........ 370/259, 351–363; 379/142.04, 211.02, 379/212.01; 709/238–244, 248–250, 709/204–211
See application file for complete search history.

(56) References Cited

U.S. PATENT DOCUMENTS

| | | | | |
|---|---|---|---|---|
| 7,894,587 B1 * | 2/2011 | Laurinavichus | ......... | 379/207.14 |
| 8,146,000 B1 * | 3/2012 | Boliek et al. | ................... | 715/748 |
| 2008/0260137 A1 * | 10/2008 | Poi et al. | .................. | 379/212.01 |
| 2009/0238359 A1 * | 9/2009 | Ely et al. | .................. | 379/265.02 |
| 2010/0329437 A1 * | 12/2010 | Jeffs et al. | ................ | 379/112.06 |

OTHER PUBLICATIONS

Cisco Systems, translation routing discussion board, website: https://supportforums.cisco.com/message/1035916?tstart=0, 2 pages, printed Aug. 2, 2011.

* cited by examiner

*Primary Examiner* — Andrew Lai
*Assistant Examiner* — M Mostazir Rahman

(57) ABSTRACT

When a call is received at a first contact center, information is collected about the call. The information can be information that the caller enters through an Interactive Voice Response (IVR) system, an Automatic Number Identification (ANI), an associated Universal Caller Identification (UCID), other information gathered from the caller, and the like. An identifier associated with a second contact center, such as a Dialed Number Identification Service (DNIS) number, is associated with the information and stored in a shared resource. The call is transferred to the second contact center using the identifier. As the transferred call comes into the second contact center, the second contact center determines if the identifier in the transferred call matches the stored identifier. If so, the information is used in the second contact center for various purposes in supporting the call, such as routing the call in the second contact center.

15 Claims, 4 Drawing Sheets

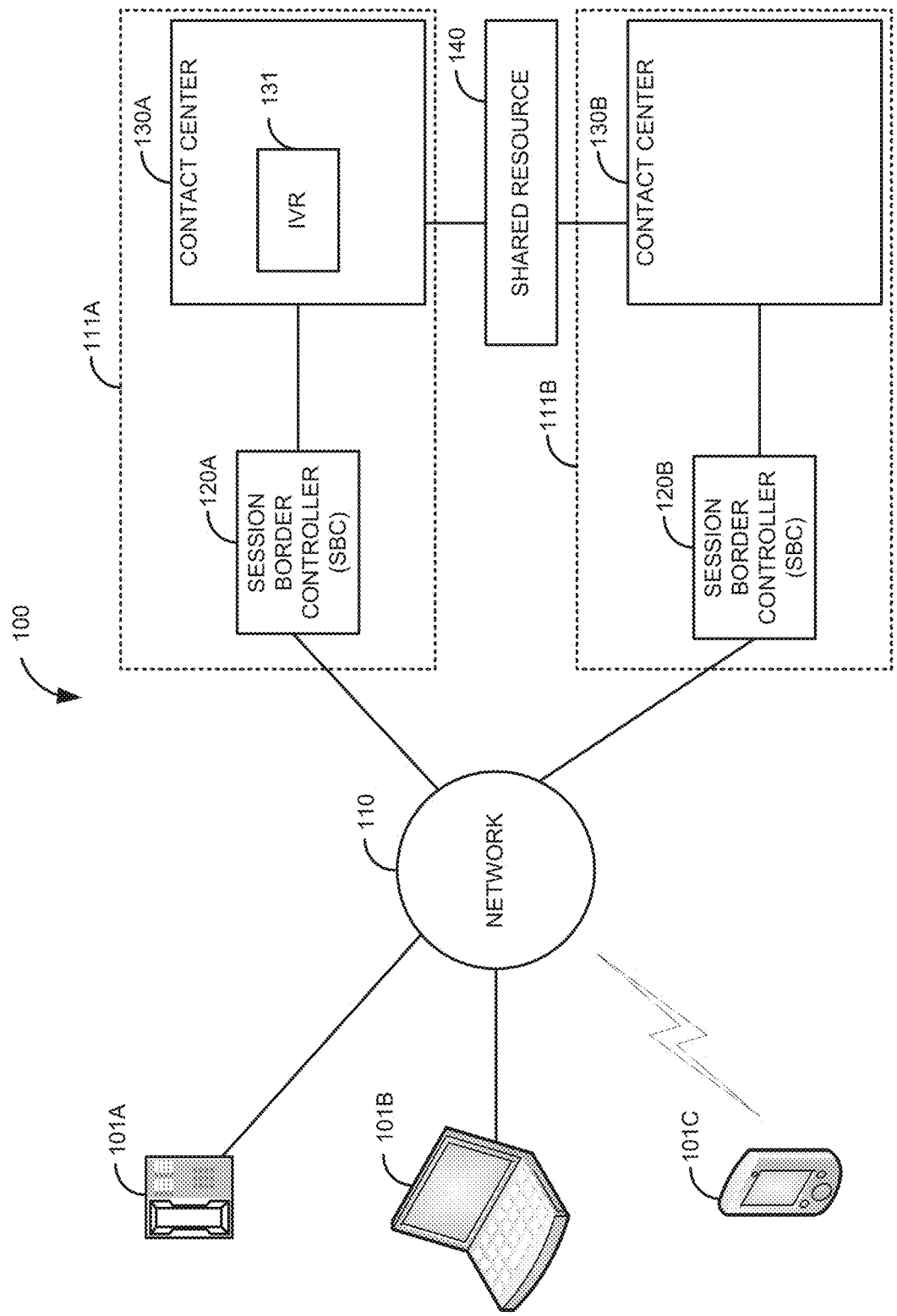

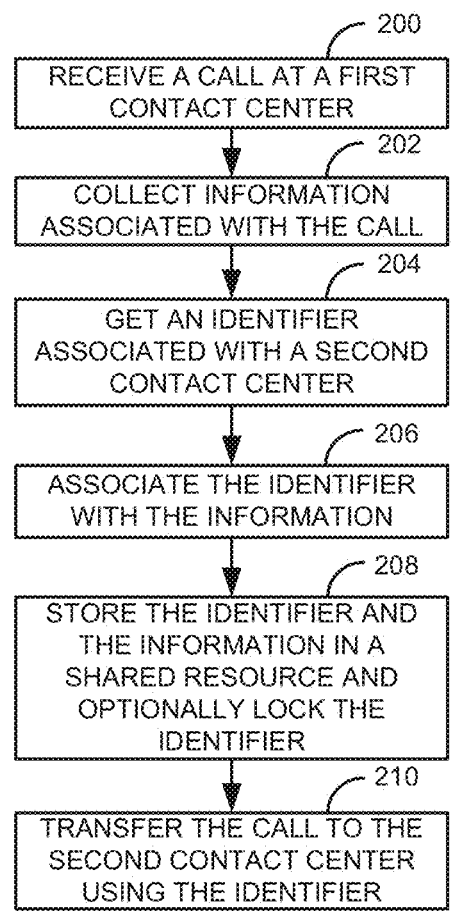
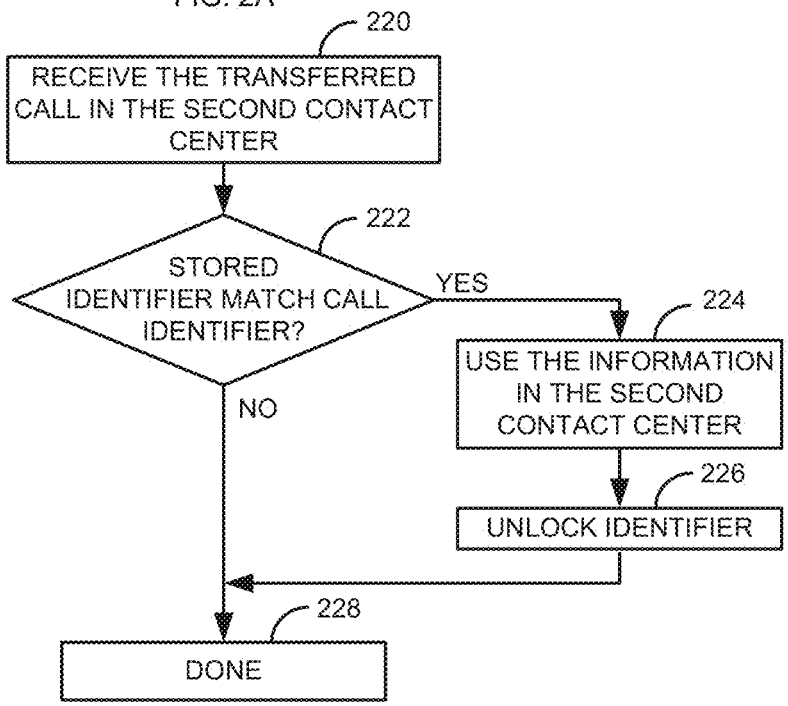

SYSTEM AND METHOD OF TRANSFERRING INFORMATION BETWEEN CONTACT CENTERS

TECHNICAL FIELD

The system and method relates to contact centers and in particular to transferring information between contact centers.

BACKGROUND

Today, the use of contact centers to provide support for products and services is a staple of many companies. The demand of providing high quality, yet low cost, support via contact centers is continuing to increase. Typically, companies have contact centers in various parts of the world in order to reduced costs and provide support twenty-four hours a day, seven days a week ("24/7"). To meet the increasing demand for these types of services, a company may contract with a third party to provide contact center services during peak or overflow conditions. Other alternatives may be to provide the capability to transfer calls between different contact centers that are owned by the company.

One of the problems that companies and providers of contact center services face is that even though the disparate contact centers may use a common protocol, such as Session Initiation Protocol (SIP), the networks between the contact centers likely use a different protocol. For example, the call may be transferred between the call centers on a public network such as the Public Switched Telephone Network, which uses non-SIP protocols. As a result, when a call is transferred between contact centers, information can be lost. For example, a customer may have initially entered personal information or information about the type of service that he/she is looking for. When a call is transferred between disparate contact centers, information like this can be lost due to protocol incompatibilities between the contact center and the service provider that interconnects the contact centers. This results in decreased customer satisfaction and increased costs. What is needed is a way to share information between contact centers when a call is transferred between the contact centers in this type of environment.

SUMMARY

The system and method are directed to solving these and other problems and disadvantages of the prior art. When a call is received at a first contact center, information is collected about the call. The information can be information that the caller enters through an Interactive Voice Response (IVR) system, an Automatic Number Identification (ANI), an associated Universal Caller Identification (UCID), other information gathered from the caller, and the like. An identifier associated with a second contact center, such as a Dialed Number Identification Service (DNIS) number, is associated with the information and stored in a shared resource. The call is transferred to the second contact center using the identifier. As the transferred call comes into the second contact center, the second contact center determines if the identifier in the transferred call matches the stored identifier. If so, information associated with the identifier is used in the second contact center for various purposes in supporting the call; for example, the information can be used to route the call in the second contact center.

Other embodiments include the capability of locking the identifier so that it will not be used with a different call that is transferred between the two contact centers. Once the call is successfully transferred or completed, the identifier can be unlocked so that it can be used again to transfer other calls between the contact centers.

One embodiment describes a disparate system that consists of calls coming from a public network such as the Public Switched Telephone Network (PSTN) into a Session Initiation Protocol (SIP) based contact center. The call is transferred via the PSTN to the second contact center, which is also SIP-based. The system and method allow for the transfer of the information across these types of disparate systems.

BRIEF DESCRIPTION OF THE DRAWINGS

In order to describe the manner in which other advantages and features of the disclosure can be obtained, a more particular description of the principles and the best mode briefly described below will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1 is a block diagram of a first illustrative system for sharing information between contact centers.

FIG. 2A is a flow diagram of a method for sharing information between contact centers.

FIG. 2B is a flow diagram of a method for sharing information between contact centers.

DETAILED DESCRIPTION

Figure 3:
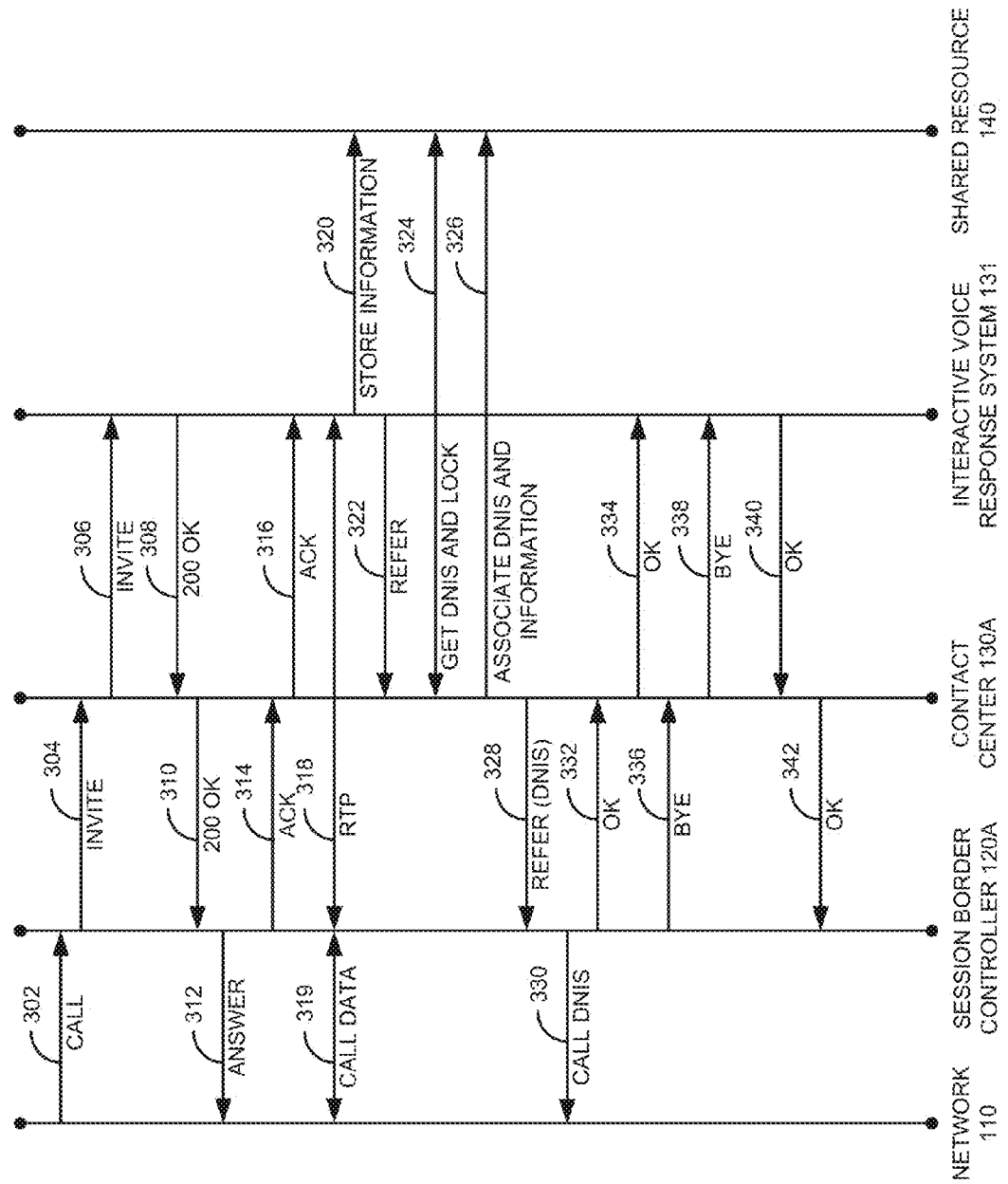
FIG. 3 is a flow diagram of a method for sharing information between Session Initiation Protocol (SIP) based contact centers.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is a block diagram of a first illustrative system 100 for sharing information between contact centers. The first illustrative system 100 comprises communication devices 101A-101C, network 110, session border controllers 120A-120B, contact centers 130A-130B, enterprise networks 111A-111B, and shared resource 140.

Communication devices 101A-101C can be any device that can communicate with network 110. For example, communication device 101 can be a telephone, a personal computer (PC), a laptop computer, a Personal Digital Assistant (PDA), a tablet computer, a cell phone, and the like.

Network 110 can be any type of network, such as the Public Switched Telephone Network (PSTN), a cellular network, the Internet, a Local Area Network (LAN), a Wide Area Network (WAN), a corporate network, a combination of these, and the like. Network 110 can be a public or private network. Network 110 can support a variety of protocols, such as Time Division Multiplexing (TDM) switching, Asynchronous Transfer Mode (ATM), Integrated Digital Services Network (ISDN), Internet Protocol (IP), Plain Old Telephone Service (POTS), Session Initiation Protocol (SIP), and the like. Enterprise networks 111A-111B can be a LAN, a WAN, a corporate network, a service provider network, and the like.

Session border controllers 120A-120B can be any hardware/software that provides services between network 110 and enterprise networks 111A-111B. Session border controllers 120A-120B can be a server, a router, a firewall, and the like. Session border controllers 120A-120B can provide conversion of protocols between network 110 and enterprise networks 111A-111B. For example, if network 110 is the Public Switched Telephone Network (PSTN) and enterprise networks 111A-111B use Session Initiation Protocol (SIP), session border controllers 120A-120B can provide a conversion service to convert the information used in the PSTN and the SIP based enterprise networks 111A-111B.

Contact centers 130A-130B can be any contact center 130 that can provide support services. For example, contact centers 130A-130B can provide different modalities of contact, such as inbound telephone support, outbound telephone contacting, Instant Message (IM) support, email support, video conferencing, and the like. Contact centers 130A-130B can be individually dispersed in different geographic locations and can include multiple contact centers 130. Contact centers 130A-130B will typically have agents (not shown) that will support the different contact modalities supported in the contact center 130. Contact centers 130A-130B may be owned by the same company or may be owned by different companies. Contact centers 130A-130B are typically located in different geographic locations. However, the contact centers 130A-130B do not have to be geographically dispersed.

Contact center 130A is shown comprising Interactive Voice Response (IVR) system 131. IVR 131 can be any hardware/software that can interact with a customer calling into contact center 130A. The interaction can be accomplished visually, audibly, via text, and the like. IVR 131 will typically have a series of menus that the customer will interact with in order to route the customer to an appropriate agent in contact center 130A. IVR 131 is only shown in contact center 130A. However, contact center 130B can comprise an IVR 131 as well.

Shared resource 140 can be any common resource that is shared between contact center 130A and contact center 130B. For example, shared resource 140 can be a web server, a database, a file server, and the like. Shared resource 140 is shown separate from network 110. However, shared resource 140 could be part of network 110.

A customer at communication device 101 places a call to contact center 130A. The call is typically a voice call. However, the call can be a video call. The call typically is routed to contact center 130A via the customer's service provider network (i.e., network 110). The call is the received session border controller 120A and routed to contact center 130A. Contact center 130A collects information associated with the call. For example, information associated with the call can be information collected by IVR 131 when the customer enters information via a voice menu in IVR 131. Other types of information associated with the call can include, but is not limited to, information entered by an agent, information in a database associated with the customer, a recording of the call, an associated email, an associated Instant Message (IM), notes on a prior call from the customer, and the like.

Contact center 130A gets an identifier associated with contact center 130B. The identifier can be a phone number, an Internet Protocol (IP) address, a Dialed Number Identification Service (DNIS) number, or any identifier that can uniquely identify a call into contact center 130B. The identifier is associated with the information collected about the call. The identifier and the collected information are stored in shared resource 140.

Contact center 130A transfers the call to contact center 130B using the identifier. Contact center 130B receives the transferred call that includes the identifier. Contact center 130B determines if the identifier in the transferred call matches the stored identifier. If there is a match, contact center 130B uses the stored information. For example, contact center 130B can use the stored information to route the transferred call in contact center 130B.

FIG. 2A is a flow diagram of a method for sharing information between contact centers 130. Illustratively, communication devices 101A-101C, network 110, enterprise networks 111A-111B, session border controllers 120A-120B, contact centers 130A-130B, and IVR 131 are stored-program-controlled entities, such as a computer or processor, which performs the method of FIGS. 2A, 2B, 3, and 4 and the processes described herein by executing program instructions stored in a tangible computer readable storage medium, such as a memory or disk.

The steps of FIG. 2A are shown in regard to contact center 130A. The process begins in step 200 when a call is received 200 at contact center 130A. Contact center 130A collects 202 information associated with the call. Contact center 130A gets 204 an identifier associated with contact center 130B. Contact center 130A associates 206 the identifier with the information. The identifier and the information are stored 208 in shared resource 140. In addition, contact center 130A can optionally lock the identifier in step 208. Contact center 130A may lock the identifier so that it will not be used by a different call that is transferred between the contact center 130A and 130B. For example, if the identifier is a DNIS number, contact center 130A can lock the DNIS number for contact center 130B for a time period (i.e., based on a timer that frees up the DNIS if not unlocked within the time period) or until the DNIS number is unlocked by contact center 130B when the call is successfully transferred to or completed in contact center 130B (in step 226). The call is transferred 210 from contact center 130A to contact center 130B using the identifier. The call can be transferred via network 110 or directly between enterprise networks 111A-111B.

FIG. 2B is a flow diagram of a method for sharing information between contact centers. The steps of FIG. 2B are shown in regard to contact center 130B when the call is transferred from contact center 130A in step 210. After the call is transferred from contact center 130A in step 210, the transferred call is received 220 in contact center 130B. The transferred call includes the identifier. Contact center 130B determines in step 222 if the identifier in the transferred call matches the stored identifier. If the identifier does not match, the process is done 228.

Otherwise, if the identifier in the transferred call matches the stored identifier in step 222, contact center 130B uses 224 the stored information in contact center 130B. For example, if the stored information is information about a customer who is making the call, contact center 130B can use the stored information by presenting the stored information to an agent when servicing the transferred call to provide an enhanced customer experience. Contact center 130B unlocks 226 the identifier (assuming that the identifier was locked in step 208) and the process is done 228.

Figure 4:
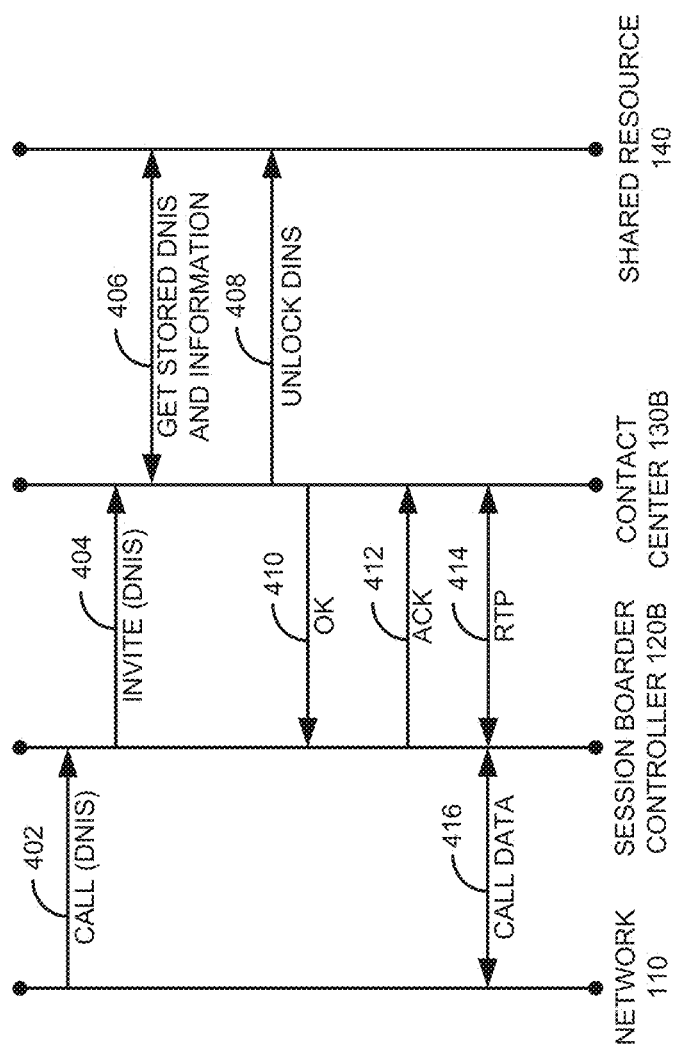
FIG. 4 is a flow diagram of a method for sharing information between Session Initiation Protocol (SIP) based contact centers.

FIG. 3 is a flow diagram of a method for sharing information between Session Initiation Protocol (SIP) based contact centers 130. The method illustrated in FIGS. 3 and 4 illustrates an embodiment of network 110 using different protocol (such as those used by the Public Switched Telephone Network) than enterprise networks 111A-111B (using Session Initiation Protocol).

A call is initiated by communication device 101 and a call message 302 is received at session border controller 120A from network 110. In response to the call message in step 302, session border controller 130A sends a Session Initiation Protocol (SIP) INVITE in step 304 to contact center 130A. Contact center 130A sends 306 the SIP INVITE to IVR 131. In response to the SIP INVITE, IVR 131 sends 308 a 200 OK to contact center 130A. Contact center 130A sends 310 the 200 OK to session border controller 120A. Session border controller 120A sends an answer 312 to network 110. Session border controller 120A sends 314 an ACK to contact center 130, which in turn sends 316 the ACK to IVR 131. At this point, the call is established and a Real-time Transport Protocol (RTP) stream is created in step 318 between IVR 131 and session border controller 120A. The RTP stream is converted by session border controller 120A to non SIP call data in step 319 so that the customer at communication device 101 can communicate with IVR 131.

In this exemplary embodiment, IVR 131 gets information from the customer. For example, IVR 131 can get information about a specific product, about a product being returned, about the customer, such as their address, and the like. The information collected by IVR 131 can be stored as key-value pairs that are stored under the Universal Caller ID (UCID) of the caller. The key value pairs can correspond to the menu and the entry selected by the customer. IVR 131 stores 320 the information in shared resource 140. IVR 131 sends 322 a REFER (an indication to transfer the call) to contact center 130A. The REFER generated in step 322 can be generated based on a variety of factors. For example, if the customer selects a specific menu wanting to return a specific product. Based on the selection, IVR 131 can determine that the call needs to be transferred to contact center 130B because contact center 130B handles calls dealing with the specific product that the customer is looking to return.

In response to the REFER in step 322, contact center 130A gets 324 a Dialed Number Identification Service (DNIS) number (an identifier) for contact center 130A. Contact center 130A can also lock the DNIS number in step 324. DNIS is a service that is provided by various telecommunication companies that identifies a specific number called by a user. In this example, the DNIS is used in contact center 130B to identify a specific number (e.g., an extension of a specific agent or group of agents) when the call is transferred to contact center 130B via a common number (e.g., a 1-800 number). Contact center 131A associates 326 the DNIS number with the stored information (stored in step 320).

Contact center 131A sends 328 the REFER (that includes the DNIS) to session border controller 120A. This REFER is used to transfer the call to contact center 130B. Session border controller 120A sends 330 a call DNIS message to network 110 (i.e., call 1-800 number of contact center 130B with DNIS). Session border controller 120A sends 332 an OK to contact center 130A. Contact center 130A sends 334 the OK to IVR 131. Session border controller sends 336 a BYE to contact center 130A. Contact center 130A sends 338 the BYE to IVR 131 to drop the call into IVR 131. IVR 131 sends 340 an OK to contact center 130A. Contact center 130A sends 342 the OK to session border controller 120A. At this point, the call has been transferred out of contact center 130A.

FIG. 4 is a flow diagram of a method for sharing information between Session Initiation Protocol (SIP) based contact centers 130. FIG. 4 is a follow on the process described in FIG. 3. A call message (sent in response to the call DNIS message sent in step 330) is received from network 110 at session border controller 120B in step 402. The call message includes the DNIS sent in step 330. Responsive to receiving the call with the DNIS in step 402, session border controller 120B sends 404 a SIP INVITE to contact center 130B with the DNIS. In response to receiving the SIP INVITE with the DNIS number, contact center 130B gets 406 the stored DNIS (the identifier) and the information. Contact center 130A determines if the DINS in the INVITE from step 404 matches the stored DNIS. If there is a match, contact center 130B can unlock 408 the DNIS (if locked in step 326). If the DNIS in the INVITE is stored in shared resource 140, contact center 130A can use the information in various ways, such as routing the call through contact center 130B.

Contact center 130B sends 410 an OK to session border controller 120B. Session border controller 120B sends 412 an ACK 412 to contact center 130B. At this point a call is set up and a Real-time Transport Protocol (RTP) session is created in step 412 between session border controller 120B and contact center 130B. A call with call data is established between session border controller 120B and network 110 in step 416. This way the call data to and from network 110 (the customer) can be sent to contact center 130B.

In this example, contact center 130B is not shown to include an IVR 131. However, the method of FIG. 4 could be easily expanded to send the INVITE in step 404 to an IVR 131 in a similar manner as shown in FIG. 3.

Herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Herein, the term "a," "an," or another entity refers to one or more of that entity. As such, the terms "a" (or "an"), "one or more" and "at least one" can be used interchangeably herein. It is also to be noted that the terms "comprising," "including," and "having" can be used interchangeably. Of course, various changes and modifications to the illustrative embodiment described above will be apparent to those skilled in the art. These changes and modifications can be made without departing from the spirit and the scope of the system and method and without diminishing its attendant advantages. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving a call at a first contact center;
   the first contact center collecting information associated with the call;
   the first contact center getting a second contact center identifier associated with a second contact center, wherein the second contact center identifier is a Dialed Number Identification Service (DNIS) number;

the first contact center associating the second contact center DNIS number with the information;
the first contact center storing the second contact center DNIS number and the information in a shared resource independent of the first contact center and the second contact center;
the first contact center locking the second contact center DNIS number prior to transferring the call;
the first contact center transferring the call to the second contact center, wherein the transferred call includes the second contact center DNIS number;
the second contact center receiving the transferred call with the second contact center DNIS number;
the second contact center determining if the second contact center DNIS number in the transferred call matches the stored second contact center DNIS number; and
the second contact center, responsive to determining that the second contact center DNIS number in the transferred call matches the stored second contact center DNIS number, retrieving the stored information from the shared resource and using stored information in the second contact center corresponding to the stored information in the shared resource, wherein the stored information is available to the second contact center independent of network devices and network protocols between the first contact center and the second contact center.

2. The method of claim 1, wherein using the stored information in the second contact center comprises routing the transferred call in the second contact center.

3. The method of claim 1, wherein the stored information is information entered by a user into an Interactive Voice Response (IVR) system.

4. The method of claim 1, wherein the stored information includes at least one of the following: an Automatic Number Identification (ANI), a set of at least one key value pairs, and an associated Universal Caller Identification (UCID).

5. The method of claim 1, wherein the shared resource is a web server.

6. The method of claim 1, wherein the information comprises information about a user making the call and using the stored information comprises displaying at least some of the stored information to an agent in the second contact center.

7. The method of claim 1, wherein the call is an audio or a video call.

8. A system comprising:
a first contact center configured to receive a call, collect information associated with the call, get a second contact center identifier associated with a second contact center, wherein the second contact center identifier is a Dialed Number Identification Service (DNIS) number, associate the second contact center DNIS number with the information, store the second contact center DNIS number and the information in a shared resource independent of the first contact center and the second contact center, lock the second contact center DNIS number prior to transferring the call, and transfer the call to the second contact center, wherein the transferred call includes the second contact center DNIS number;
the second contact center configured to receive the transferred call with the second contact center DNIS number, determine if the second contact center DNIS number in the transferred call matches the stored second contact center DNIS number, and responsive to determining that the second contact center DNIS number in the transferred call matches the stored second contact center DNIS number, retrieves the stored information from the shared resource and uses stored information in the second contact center corresponding to the stored information in the shared resource, wherein the stored information is available to the second contact center independent of network devices and network protocols between the first contact center and the second contact center.

9. The system of claim 8, wherein the second contact center is configured to use the stored information to route the transferred call in the second contact center.

10. The system of claim 8, wherein the stored information is information entered by a user into an Interactive Voice Response (IVR) system.

11. The system of claim 8, wherein the stored information includes at least one of the following: an Automatic Number Identification (ANI), a set of at least one key value pairs, and an associated Universal Caller Identification (UCID).

12. The system of claim 8, wherein the shared resource is a web server.

13. The system of claim 8, wherein the information comprises information about a user making the call and using the stored information comprises displaying at least some of the stored information to an agent in the second contact center.

14. The system of claim 8, wherein the call is an audio or a video call.

15. A method comprising:
receiving a call at a first Session Initiation Protocol (SIP) based contact center from a non-SIP-based public network;
the first SIP-based contact center collecting information associated with the call;
the first SIP-based contact center getting a second SIP-based contact center identifier associated with a second SIP-based contact center, wherein the second contact center identifier is a Dialed Number Identification Service (DNIS) number;
the first SIP-based contact center associating the second SIP-based contact center DNIS number with the information;
the first SIP-based contact center storing the second SIP-based contact center DNIS number and the information in a shared resource independent of the first SIP-based contact center and the second SIP-based contact center;
the first SIP-based contact center locking the second contact center DNIS number prior to transferring the call;
the first SIP-based contact center transferring the call via the non-SIP public network to the second SIP-based contact center, wherein the transferred call includes the second SIP-based contact center DNIS number;
the second SIP-based contact center receiving the transferred call with the second SIP-based contact center DNIS number;
the second SIP-based contact center determining if the second SIP-based contact center DNIS number in the transferred call matches the stored second SIP-based contact center DNIS number; and
the second SIP-based contact center, responsive to determining that the second SIP-based contact center DNIS number in the transferred call matches the stored second SIP-based contact center DNIS number, retrieving the stored information from the shared resource and using stored information in the second SIP-based contact center corresponding to the stored information in the shared resource, wherein the stored information is available to the second SIP-based contact center independent of network devices and network protocols between the first SIP-based contact center and the second SIP-based contact center.

* * * * *